United States Patent [19]

Reenstra

[11] 3,898,529

[45] Aug. 5, 1975

[54] GROUND FAULT INTERRUPTER CIRCUIT WITH GROUNDED NEUTRAL CONDUCTOR PROTECTION

[75] Inventor: Arthur L. Reenstra, Attleboro, Mass.

[73] Assignee: Texas Instruments Incorporated, Dallas, Tex.

[22] Filed: Dec. 6, 1973

[21] Appl. No.: 422,228

[52] U.S. Cl. .............................. 317/18 D; 317/27 R
[51] Int. Cl. .............................................. H02h 3/28
[58] Field of Search ....... 317/18 D, 27 R; 323/75 S, 323/89 B, 89 C

[56] References Cited
UNITED STATES PATENTS
3,609,458  9/1971  Penn................................. 317/18 D
3,614,533  10/1971  Douglas et al.................... 317/18 D Primary Examiner—James D. Trammell
Attorney, Agent, or Firm—John A. Haug; James P. McAndrews; Russell E. Baumann

[57] ABSTRACT

A ground fault interrupter circuit for detecting the presence of an electrical fault resulting in the leakage of electrical current from a load circuit to ground. The circuit comprises line and neutral electrical conductors which couple a power supply to the load circuit, with the neutral electrical conductor being coupled to ground to define a path for leakage current from the load circuit to ground. First and second selectively energizable saturable toroid cores are electrically coupled to the power supply; only one of the cores is inductively coupled to adjacent sections of the electrical conductors intermediate the load circuit and the power supply. An energizing circuit energizes the toroids to establish magnetic fields, and the magnetic field established by the core inductively coupled to the conductors is affected by unequal current flow therethrough caused by a grounded neutral conductor fault condition. Means coupled to the toroid cores senses an effect on the magnetic field and generates an electrical output signal in response thereto as an indication of current leakage to ground from the load circuit.

4 Claims, 2 Drawing Figures

GROUND FAULT INTERRUPTER CIRCUIT WITH GROUNDED NEUTRAL CONDUCTOR PROTECTION

BACKGROUND OF THE INVENTION

1. Field of the Invention

This invention relates generally to interrupter circuits, and, in particular, to a ground fault interrupter circuit for detecting the presence of an electrical fault resulting in the leakage of an electrical current from a load circuit to ground.

2. Description of the Prior Art

Ground fault interrupter circuits which utilize differential current measuring methods to detect a ground fault condition, such as known differential transformers, or magnetic amplifier electrical safety systems such as that disclosed in U.S. Pat. No. 3,617,809, generally have a reduced sensitivity to ground fault conditions when the neutral electrical conductor of the power line is grounded on the load side thereof. In order to overcome this problem, a grounded neutral conductor fault condition must either be detected by the circuit, or the circuit must be rendered insensitive to the ground fault condition. One solution used in a differential transformer type system is to couple an impedance to the neutral conductor in series with the transformer and the load circuit so that a low impedance ground fault in the neutral conductor causes a potential to be developed across the neutral conductor which is sufficient to initiate the tripping action of the interrupter circuit and does not require a substantial increase in the differential current required. See U.S. Pat. No. 3,473,091. This solution is also applicable to magnetic amplifier type devices.

When a relatively large load current flows through the interrupter circuit, sufficient leakage current is produced to trip the interrupter circuit even with a low impedance ground in the neutral conductor. However, when little or no load current flows through the interrupter circuit, sufficient current is not present to initiate tripping of the circuit. It is therefore desirable to provide some means which always senses the difference between a high impedance loading of the neutral conductor, corresponding to a normal neutral conductor condition, and a low impedance loading thereof corresponding to a grounded neutral conductor condition, irregardless the amount of current flowing through the interrupter circuit.

SUMMARY OF THE INVENTION

It is therefore an object of this invention to overcome the aforementioned disadvantages of prior art devices and to provide a ground fault interrupter circuit which assures that a low impedance ground in the neutral conductor trips the interrupter circuit and terminates the supply of power to the load circuit.

These and other objects are achieved in the present invention by a ground fault interrupter circuit which detects the presence of an electrical fault resulting in the leakage of an electrical current from a load circuit to ground. The circuit includes line and neutral electrical conductors which couple a power supply to the load circuit. The neutral conductor is coupled to ground to define a path for leakage current from the load circuit to ground. First and second selectively energizable saturable core magnetic means are electrically coupled to the power supply, but only one of the magnetic means is inductively coupled to adjacent sections of the electrical conductors intermediate the load circuit and the power supply. An energizing circuit coupled to the magnetic means energizes the saturable core magnetic means to establish magnetic fields. The magnetic field established by the magnetic means inductively coupled to the electrical conductors is affected by unequal current flow therethrough caused by the occurrence of a grounded neutral conductor fault condition; the other of the magnetic fields established by the magnetic means is, however, unaffected by such current flow. Means, coupled to the magnetic means, senses an effect on the magnetic field established by the magnetic means inductively coupled to the electrical conductors, and generates an electrical output signal in response thereto as an indication of current leakage to ground from the load circuit. The circuit of the invention may include magnetic means comprising saturable core toroids including primary and secondary windings, with the primary windings being electrically coupled either in parallel or in series relationship to the energizing circuit, and circuit interrupter means for terminating the supply of power to the load circuit when the electrical output signal is generated.

DETAILED DESCRIPTION

Figure 1:
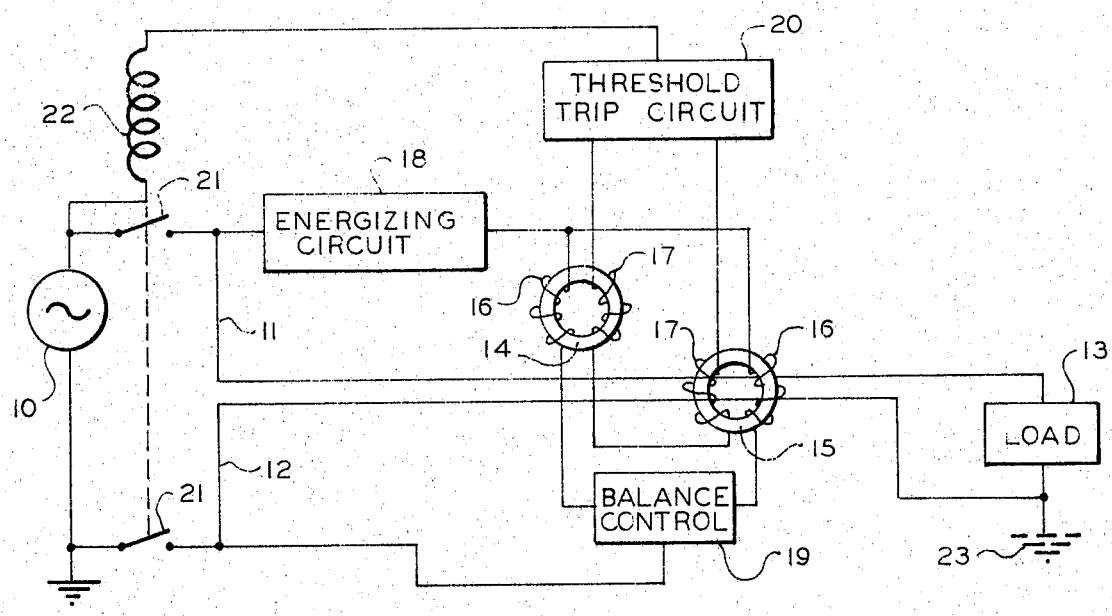
FIG. 1 is a schematic diagram of one embodiment of a ground fault interrupter circuit constructed according to the invention.
Figure 2:
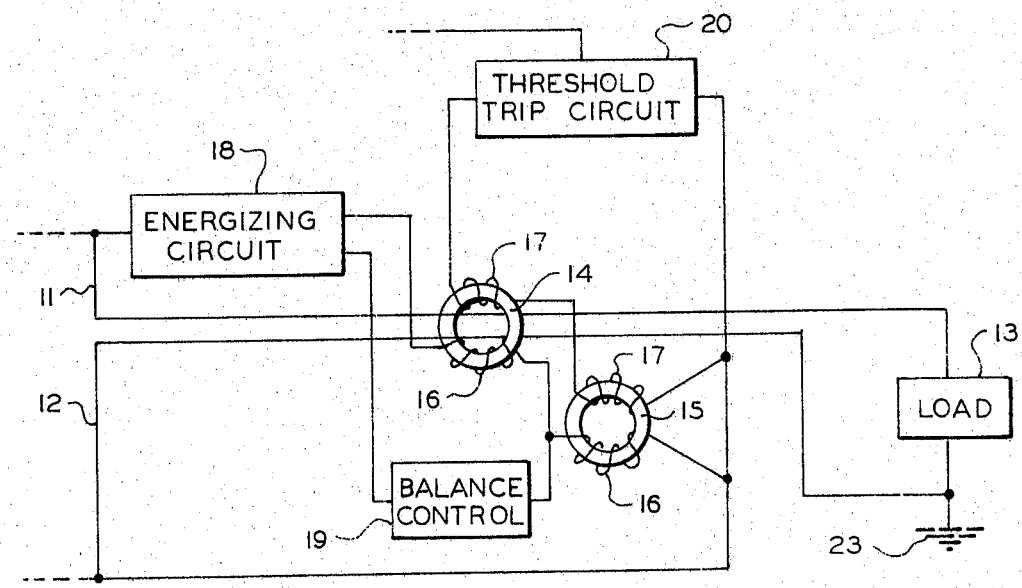
FIG. 2 is a partial schematic diagram of the ground fault interrupter circuit illustrating another embodiment thereof.

Referring now to the drawings, specifically FIG. 1, there is shown a ground fault interrupter circuit including a power supply 10 coupled by line and neutral electrical conductors 11 and 12, respectively, to a load circuit 13. Neutral conductor 12 is coupled to ground to define a path for leakage current from load circuit 13 to ground. First and second selectively energizable saturable core magnetic means illustrated as saturable core toroids 14 and 15, are electrically coupled to power supply 10. One of the toroids, in the illustrated embodiment, toroid 15, is inductively coupled to adjacent sections of conductors 11 and 12 intermediate power supply 10 and load circuit 13. Toroid 14 is not so inductively coupled to the line and neutral conductors. The toroids 14 and 15 include primary windings 16, which, in the embodiment illustrated in FIG. 1, are coupled electrically in parallel relationship, and secondary windings 17, which, in the illustrated embodiment, are electrically coupled in series relationship. An energizing circuit 18 is coupled to primary windings 16 and energizes these windings to establish magnetic fields in the toroids. Since conductors 11 and 12 are inductively coupled only to toroid 15, unequal current flow therethrough affects only the magnetic field established in that toroid. The magnetic field of toroid 17 is unaffected by such unequal current flow, and functions as a reference field to which the field of toroid 15 is compared. A balance control 19 is coupled to primary windings 16 and enables the calibration of the windings to assure the absence of an electrical output signal across secondary windings 17 during normal operating conditions. Means, illustrated as threshold trip circuit 20, coupled to the secondary windings 17, senses an effect on the magnetic field established by toroid 15, and generates an electrical output signal in response thereto as an indication of current leakage to ground from load circuit 13. Means for interrupting the supply of power from power supply 10 to load circuit 13, illustrated as relay switches 21 coupled to conductors 11 and 12, and coil 22 coupled to threshold trip circuit 20, may be provided to terminate the supply of power to the load circuit in response to the generation of the electrical output signal by the trip circuit. As stated previously, primary windings 16 are electrically coupled in parallel relationship. In such an arrangement, balance control 19 is adjusted to provide an output signal across secondary windings 17 which is sufficient in magnitude to trip the interrupter circuit upon the occurrence of a ground in the neutral conductor. However, since the condition sensed by the circuit is the impedance level of the interrupter circuit, the sensitivity of the circuit is increased if primary windings 16 are electrically coupled in series relationship, as illustrated in FIG. 2. Moreover, it should be noted (as also illustrated in FIG. 2) that either one of the toroids may be inductively coupled to the electrical conductors to effect the above described function of the circuit.

U.S. Pat. Nos. 3,609,458 and 3,617,809 describe in detail the design and operation of the ground fault interrupter circuit disclosed herein. For this reason, only a brief description of the operation of the circuit is set forth herein. Briefly, energizing circuit 18 selectively energizes the primary windings of the toroids in order to sense the presence of unequal current flow through line and neutral conductors 11 and 12 to load circuit 13. This unequal current flow is the result of ground leakage current from load circuit 13, indicated by dotted lines 23. In the presence of unequal current flow, the magnetic balance of the saturable core toroids is upset, and an output signal is generated across the secondary windings which is effective to cause the tripping of circuit breaker switches 21 and the interruption of power from supply 10 to load circuit 13.

In particular, the adjacent sections of conductors 11 and 12 pass through either one, but only one, of the saturable core toroids 14 and 15. These sections of the conductors function as an additional set of primary windings for the toroid through which they pass, and affect the magnetization of the toroid cores when unequal currents pass through the conductors. As previously states, the primary windings are coupled in parallel relationship and in series opposition such that opposite and generally equal magnetic fields are established in the toroid cores in response to energization by the primary windings. Thus, in the absence of external effects, energization of the toroids by the energizing circuit does not produce an output signal across the secondary windings 17, since the magnetic fields established in each of the toroid cores are of opposite polarity and approximately equal in magnitude. Consequently, in the absence of an electrical fault or the like, which causes a current imbalance in the electrical conductors and affects the magnetization of the toroid cores, cores 14 and 15 may be first energized by the energizing circuit and driven in a selected magnetic direction, and then selectively switched and driven in an opposite magnetic direction by the energizing circuit, without generating an output signal across the secondary windings thereof since the time-varying magnetic fields established are of generally equal magnitude and opposite polarity. A ground fault condition, however, causes unequal current flow through conductors 11 and 12, and generates a relatively weak magnetic field which is detected by its affect upon the relatively intense magnetization of toroid core 15 through which the conductors pass. This intense magnetization of the toroid cores is established during rapid switching of the magnetic states of energization of the toroids, and provides an indication of the presence of ground leakage current. In addition, a substantial amplification of the effect of the aforementioned weak magnetic field results so as to achieve a relatively high degree of sensitivity in detecting the presence of relatively minute ground leakage currents. In the arrangement of this invention, toroid 14, which is not inductively coupled to the conductors 11 and 12, functions as a reference, whereas toroid 15 is utilized to sense current leakage. When a ground occurs in the neutral conductor, toroid 15 is loaded down, unlike toroid 14, and causes an imbalance in the cross which is sufficient to generate an output signal across secondary windings 17 to trip circuit 20.

This arrangement assures that no matter what the amount of current flowing through the load circuit when the ground occurs, a signal of sufficient magnitude is generated to trip the circuit. The described rapid intense switching of the magnetic state of the toroids is effected by energizing circuit 18 which initially magnetically biases each of the toroid cores in one predetermined direction, and then rapidly switches the direction of magnetic energization of the toroid cores by applying a sharp pulse signal in order to achieve rapid switching of the state of magnetization of the toroid cores in a second opposite predetermined direction. In the absence of a magnetic field applied to the toroid cores by unequal current flow through conductors 11 and 12, each of the toroids is driven into a state of magnetic saturation by the sharp pulse signal in the same time interval. However, in the presence of a magnetic field, each of the toroids is switched into magnetic saturation in a different time interval, and an output signal is established across the secondary windings thereof in response to the effect of the weak magnetic field on the magnetic switching of toroid core 15. The described imbalance in the effects on the toroid magnetic field assures that a low impedance ground in the neutral conductor provides a sufficient effect to trip circuit 20 and interrupt the power supply to load circuit 13.

In the foregoing specification, the invention has been described with reference to specific exemplary embodiments thereof. However, it will be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A ground fault interrupter circuit for detecting the presence of an electrical fault resulting in the leakage of electrical current from a load circuit to ground, comprising:

line and neutral electrical conductors for coupling a power supply to the load circuit, said neutral electrical conductor being coupled to ground to define a path for leakage current from said load circuit to ground;

first and second selectively energizable saturable core magnetic means electrically coupled to the power supply, one of said magnetic means being inductively coupled to adjacent sections of said electrical conductors intermediate said load circuit and the power supply;

means, coupled to said magnetic means, for energizing said saturable core magnetic means to establish magnetic fields, the magnetic field established by the magnetic means inductively coupled to said electrical conductors being affected by unequal current flow therethrough caused by the occurrence of a grounded neutral conductor fault condition, the magnetic field established by the other of said magnetic means being uneffected by such current flow;

means, coupled to said magnetic means, for sensing an effect on the magnetic field established by said magnetic means inductively coupled to said electrical conductors caused by said unequal current flow, and generating an electrical output signal in response thereto as an indication of current leakage to ground from said load circuit.

2. The circuit recited in claim 1, wherein said first and second saturable core magnetic means each comprise a saturable core toroid including a primary and a secondary winding, said primary windings of said toroids being electrically coupled in parallel relationship to said energizing means, and said secondary windings thereof being electrically coupled in series relationship to said electrical output signal generating means.

3. The circuit recited in claim 1, wherein said first and second saturable core magnetic means each comprise a saturable core toroid having a primary and secondary winding, said primary windings of said toroids being electrically coupled in series relationship to said energizing means, and said secondary windings being electrically coupled in series relationship to said electrical output signal generating means.

4. The circuit recited in claim 1, further comprising means, responsive to the generation of said electrical output signal, for interrupting the supply of power from the power supply to said load circuit upon the occurrence of a grounded neutral conductor fault condition.

* * * * *